US000001045H

United States Statutory Invention Registration [19]

[11] Reg. Number: H1045

Wilson [43] Published: May 5, 1992

[54] AIR BUBBLE LEAK DETECTION TEST DEVICE

[75] Inventor: Arthur D. Wilson, Mesa, Ariz.

[73] Assignee: The United States of America as represented by the Secretary of the Army, Washington, D.C.

[21] Appl. No.: 615,182

[22] Filed: Nov. 19, 1990

[51] Int. Cl.[5] ..... G01M 3/02; G01M 3/38

[52] U.S. Cl. ..... 73/40; 73/49.3; 73/52

*Primary Examiner*—Bernarr E. Gregory

*Attorney, Agent, or Firm*—Anthony T. Lane; Edward Goldberg; Edward F. Costigan

[57] ABSTRACT

Improved measurement of leakage in fuze seals is obtained by employing an air bubble leak indicator. The fuze to be tested is connected to an air supply line coming from an air bubble leak indicator. The air bubble leak indicator has a narrow orifice submerged in a liquid, which in turn is connected to an air supply. When the system has stabilized, any leakage from the fuze seals will result in air bubbles passing through the liquid. A light source and light detector placed at the outlet of the orifice will electronically detect bubbles and provide an electronic indication of leakage. The system also offers a visual indication of leakage. All parts of the unit being tested remain in a dry condition.

7 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AIR BUBBLE LEAK DETECTION TEST DEVICE

GOVERNMENTAL INTEREST

The invention described herein may be manufactured, used, or licensed by or for the government for governmental purposes without the payment to me of any royalties thereon.

BACKGROUND AND FIELD OF THE INVENTION

This invention relates to devices for detecting leaks in seals. More particularly, this invention relates to devices for providing a visual and electronic indication of leakage in a fuze seal.

One of the performance characteristics which must be determined for a fuze seal is the degree of leakage when placed under pressure. The generally accepted method of determining such leakage has been to pressurize the unit under test, submerge it in a liquid, and visually look for bubbles. First, consistently accurate results are not readily obtainable by visual observation. Second, by its very nature, this test cannot be conducted under "dry" conditions. Finally, a significant amount of time is required for set-up and testing.

SUMMARY OF THE INVENTION

These difficulties and others not enumerated here are addressed by the invention, one embodiment of which may include a test fixture for mounting the unit to be tested and applying air pressure to it, an air bubble leak indicator, and an air supply. The air bubble leak indicator includes a chamber partially filled with a liquid. The chamber has an input orifice, situated below the liquid level, which is connected to the air supply. It further has an output orifice, situated above the liquid level, which is connected to the test fixture. If the unit under test leaks, the same quantity of air escaping from the seal will leave the air supply and pass through the air bubble leak indicator chamber. It enters the chamber from the input orifice, passes through the liquid, and leaves the chamber via the output orifice. The input orifice has a narrow diameter, forcing the air bubbles to enter the chamber in a narrow stream. A light intensity detector is placed at the opening of the input orifice and can determine whenever an air bubble passes. Further, the chamber of the air bubble leak indicator is transparent, providing a visual check of the operation of the device.

In a second embodiment, the air bubble leak detection test device is provided with a leak rate indicator. The leak rate indicator includes a manometer placed in series between the air bubble leak detection test device and the test fixture.

OBJECTS OF THE INVENTION

It is an object of the invention to provide an air bubble leak detection test device which can perform leakage tests rapidly.

A further object of the invention to provide an air bubble leak detection test device which can perform leakage tests accurately.

Yet another object of the invention to provide an air bubble leak detection test device which can perform leakage tests economically.

It is a further object of the present invention to perform leakage tests under "dry" conditions.

It is a still further object of the invention to provide an air bubble leak detection test device which can provide both a visual and an electronic indication of leakage.

It is a further object of the invention to provide an air bubble leak detection test device which can provide an indication of leakage rate.

BRIEF DESCRIPTION OF THE DRAWINGS

A more complete understanding of the present invention, as well as other objects and advantages thereof not enumerated, will become apparent upon consideration of the following detailed description, especially when considered in light of the accompanying drawings, wherein.

DETAILED DESCRIPTION OF THE INVENTION

Figure 1:
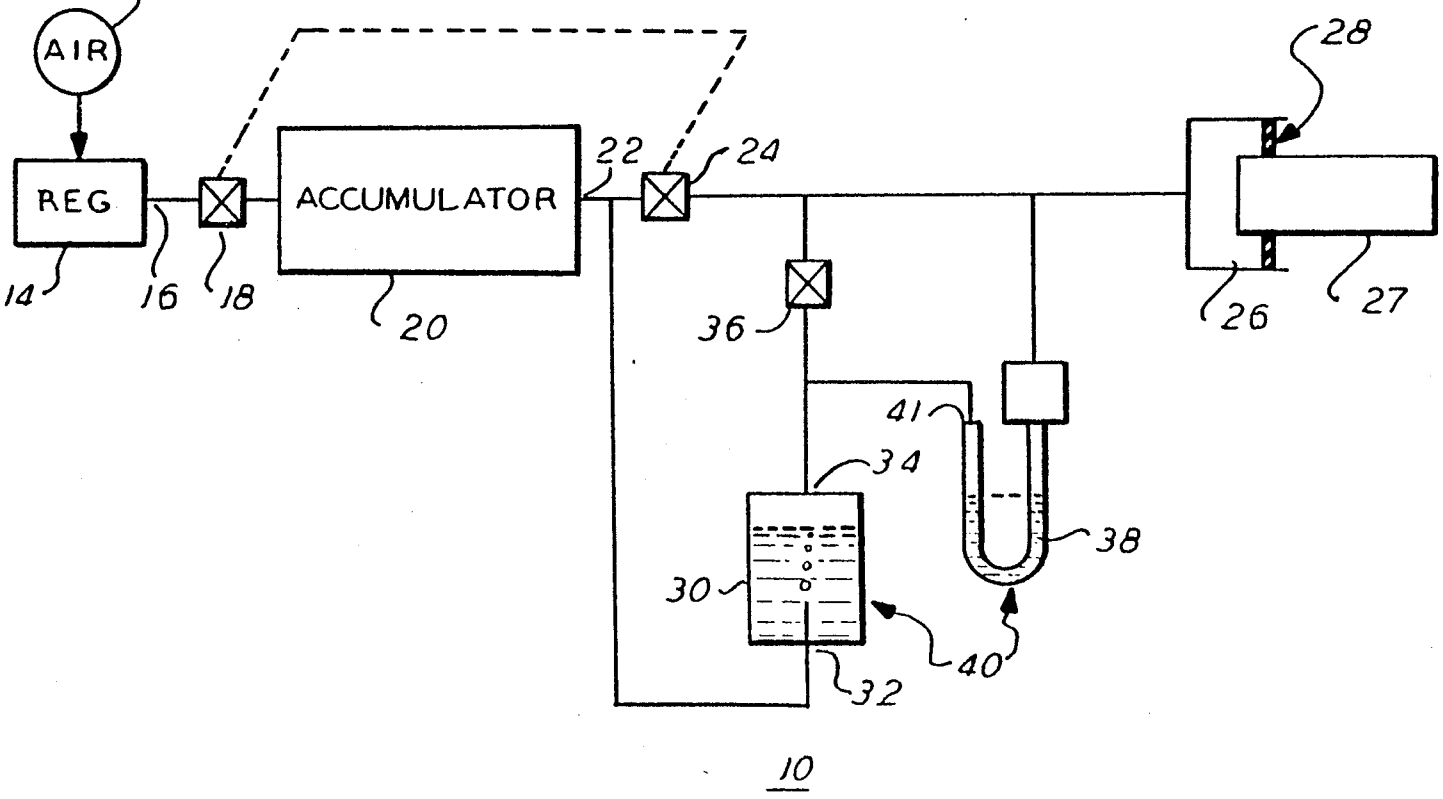
FIG. 1 is a schematic system diagram of the air bubble leak detection test device.

The structure and operation of the air bubble leak detection test device may be best explained by reference to FIG. 1. The air bubble leak detection test device or "system38 is indicated generally by reference numeral 10. The system receives pressurized air from an air supply 12. The output of the air supply 12 is unregulated and thus the system is provided with a regulator 14. The output 16 of the regulator 14 is connected to an isolation valve 18. The purpose of the isolation valve 18 is to shield the system 10 from the fluctuations in pressure of the air from the air supply 12.

The output of the isolation valve 18 is connected to an air accumulator 20. The output 22 of the accumulator 20 is connected to a pressurization valve 24. The output of the pressurization valve 24 is connected to the test fixture 26. The unit to be tested 27 is placed in the test fixture 26 and clamped by seal 28. The output 22 of the accumulator 20 is also connected to an air bubble leak indicator 30 through its input 32. The output 34 of the air bubble leak indicator 30 is connected to a bypass valve 36. The output 34 of the air bubble leak indicator 30 is also connected to a manometer 38 through its input 41. The output of the bypass valve 36 and the output of the manometer 38 are connected to the test fixture 26. Both the air bubble leak indicator 30 and the manometer 38 are partially filled with liquid 40.

Figure 2:
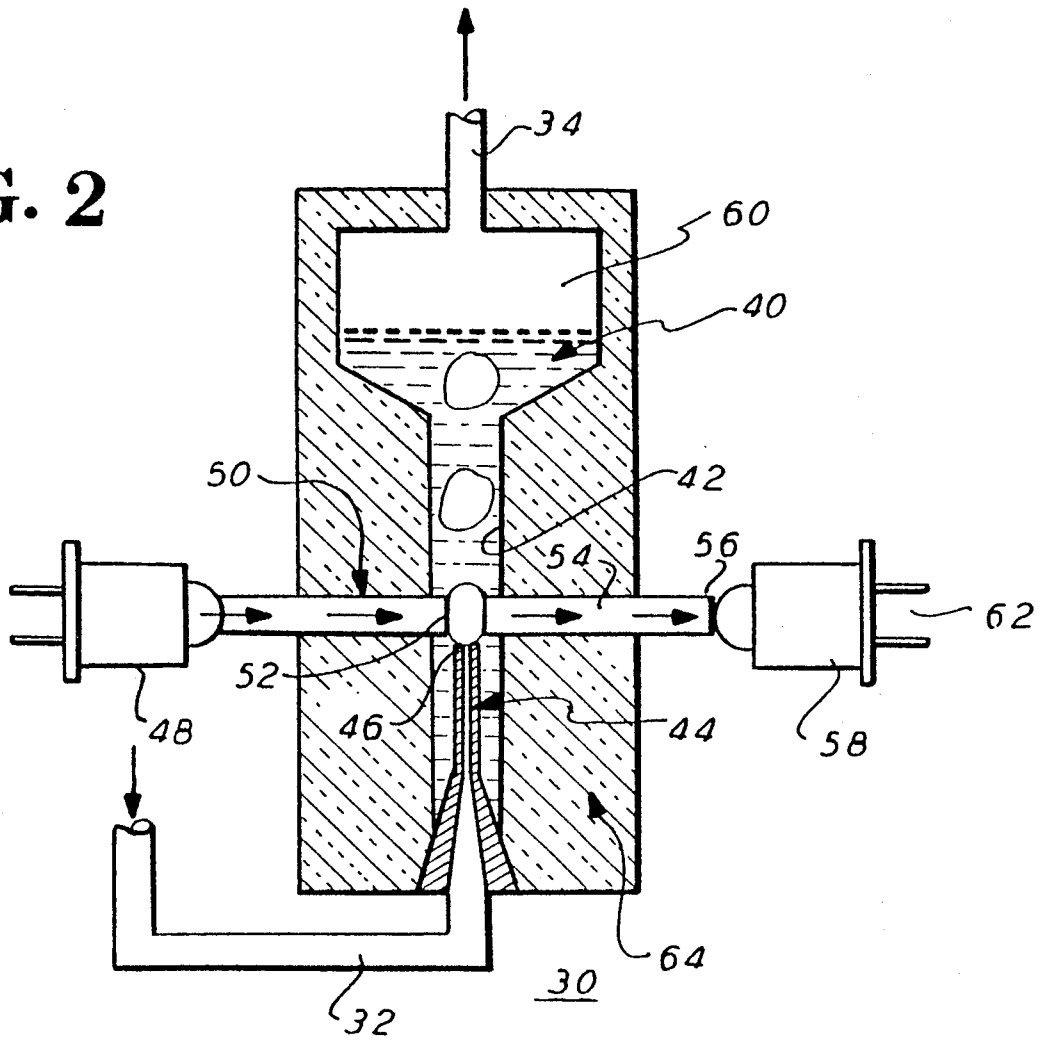
FIG. 2 is a partial cross-sectional view of the air bubble leak indicator.

The air bubble leak indicator 30 is illustrated in greater detail in FIG. 2. The air bubble leak indicator 30 has a narrow internal chamber 42 partially filled with liquid 40. The input 32 of the air bubble leak indicator 30 is connected to a narrow orifice 44 located inside the internal chamber 42. The outlet 46 of the orifice 44 will emit a stream of bubbles if air leaks from the unit under test 27.

The following structure provides the means for detecting a stream of air bubbles. A light source 48 emits light which is directed into a fiber optic conduit 50. The output 52 of the fiber optic conduit 50 is positioned at the outlet 46 of the narrow orifice 44. A second fiber optic conduit 54 is positioned colinearly with respect to the first fiber optic conduit 50 just beyond the outlet 46 of the narrow orifice 44. The outlet 56 of the second fiber optic conduit 54 is positioned adjacent to a light detector 58.

Air bubbles passing through the liquid 40 in the air bubble leak indicator 30 enter an upper chamber 60.

The air flow then leaves the upper chamber 60 through the output 34 of the air bubble leak indicator 30.

To operate the system, all valves, the isolation valve 18, the pressurization valve 24, and the bypass valve 36, are opened. This will permit the system lines to pressurize. After a short interval, the isolation valve 18 is closed. Typically, the pressurization valve 24 will be linked to the isolation valve 18, so that both valves are closed. The air bubble leak indicator 30, which is constructed from a transparent material 64, will register any indication of leakage from the unit under test 27. If there is leakage, air bubbles will flow upward through the liquid 40 in the chamber 42 of the air bubble leak indicator 30. This can be determined visually. The passage of bubbles past the fiber optic conduits 50 and 54 will diffract the light passing between them. If an oscilloscope or similar device is connected to the output 62 of the light detector 58, this diffraction, or rather the passage of air bubbles, will be detected.

An indication of rate of leakage can be had by closing bypass valve 36. This will shunt the output of air flow from the air bubble leak indicator 30 to the input 41 of the manometer 38. If one does not desire to measure leakage rate, the manometer 38 and the bypass valve 36 can be elimianted. The output 34 of the air bubble leak indicator 30 would then be connected directly to the line connecting the pressurization valve 24 and the test fixture 26.

While there has been described what is the believed to be the preferred embodiment of the invention, those skilled in the art will recognize that other and further modifications may be made thereto without departing from the spirit of the invention, and it is intended to claim all such embodiments that fall within the true scope of the invention.

What is claimed:

1. A leakage detection test device, comprising:

test fixture means for supporting a unit to be tested and applying air pressure to it, having an input;

air supply means having an output;

air bubble detection means for detecting the passage of air, having an input connected to the air supply means, an internal chamber partially filled with a liquid, input orifice means positioned in the internal chamber in the liquid and connected to the input, and output means positioned in the chamber above the liquid and connected to the input of the test fixture means.

2. A leakage detection test device as set forth in claim 1 above where the air bubble detection means further includes light intensity detection means adjacent the input orifice means of the air bubble detection means.

3. A leakage detection test device as set forth in claim 2 above where the walls of the air bubble detection means are transparent.

4. A leakage detection test device as set forth in claim 3 above where the input orifice is narrow.

5. A leakage detection test device as set forth in claim 4 above where the light intensity detection means includes light source means and light detection means.

6. A leakage detection test device as set forth in claim 5 above further including leakage rate detection means connected between the air bubble detection means and the text fixture means.

7. A leakage detection test device as set forth in claim 6 above where the leakage rate detection means includes manometer means.

* * * * *